United States Patent [19]
Hardman

[11] 3,836,397
[45] Sept. 17, 1974

[54] IRON ELECTRODE FOR ALKALINE CELLS
[75] Inventor: Carl C. Hardman, Pittsburgh, Pa.
[73] Assignee: Westinghouse Electric Corporation, Pittsburgh, Pa.
[22] Filed: July 31, 1972
[21] Appl. No.: 276,486

[52] U.S. Cl. .................................................. 136/25
[51] Int. Cl. ........................................... H01m 43/04
[58] Field of Search .................. 136/25, 20; 106/70

[56] References Cited
UNITED STATES PATENTS

| | | | |
|---|---|---|---|
| 1,761,740 | 6/1930 | Nordlander | 106/70 |
| 3,181,960 | 5/1965 | King et al. | 106/70 X |
| 3,189,668 | 6/1965 | Miller, Jr. | 106/70 X |
| 3,507,696 | 4/1970 | Jackovitz et al. | 136/25 |
| 3,527,613 | 9/1970 | Hardman | 136/25 |
| 3,650,835 | 3/1972 | Jackovitz et al. | 136/25 |
| 3,679,482 | 7/1972 | Hardman | 136/25 |

Primary Examiner—Winston A. Douglas
Assistant Examiner—C. F. LeFevour
Attorney, Agent, or Firm—D. P. Cillo

[57] ABSTRACT

A battery is made containing at least one positive and one negative electrode plate with electrolyte contacting the plates, the negative electrode plate containing an active material comprising about 60–80 weight percent iron particles over about 5 microns diameter and about 20–40 weight percent iron particles up to about 2 microns diameter, the iron particles having a fused coating of sulfur, selenium or tellurium.

5 Claims, 2 Drawing Figures

PATENTED SEP 17 1974          3,836,397

IRON OXIDE

FUSE COATING OF ADDITIVE

IRON ELECTRODE FOR ALKALINE CELLS

BACKGROUND OF THE INVENTION

This invention relates to improved active material combining sulfur, selenium, or tellurium additives with iron oxides and/or iron oxide hydrates. It is generally known that a negative iron battery electrode plate in an alkali electrolyte functions because of oxidation of metallic iron to hydroxides or oxides of iron or both. The iron battery electrode plate is generally composed of a finely divided iron oxide powder, deposited or impregnated in a supporting plaque and compacted to a desired density. The iron powder can include ferrous oxide (FeO), ferric oxide ($Fe_2O_3$), ferroso-ferric oxide (FeO·$Fe_2O_3$ or $Fe_3O_4$), hydrated ferric oxide ($Fe_2O_3$·$H_2O$) and mixtures thereof. Suitable sources of iron oxide powder are natural magnetite which contains $Fe_3O_4$ and $Fe_2O_3$ and synthetic magnetite which contains $Fe_2O_3$ and FeO.

When pure iron oxide powder is used as an electrode active material in an alkali electrolyte, a battery has limited utilization due to the rapid formation of a passivating film on the iron powder surface. To promote the charging of the compacted powder, as well as to facilitate the discharging of the electrode plate, a reaction promoting additive for the electrode active material is needed. Such an additive should have the ability to activate the entire substance, though present in relatively small amounts. The properties of such an additive should approach those of a transfer catalyst, causing the breakdown of any protective film and thus keeping the iron active material surface in an active state.

The addition of sulfur or sulfur-bearing materials, such as FeS, as additives to iron oxide powder is known in the art. Such materials have generally been incorporated throughout the iron oxide in small amounts in intimate mixture. In subsequent aqueous slurry impregnation of supporting plaques, the mixture of iron oxide powder and additive easily separate.

Jackovitz, in U.S. Pat. No. 3,507,696 solved this problem and also provided an iron battery electrode having improved performance, by fuse coating elemental sulfur onto iron oxide particles. This fuse coated iron oxide active material provided excellent Ah/g output with finely divided iron oxides, such as found in synthetic magnetite. The fine fuse coated oxides, however, were very adhesive in aqueous paste form, complicating paste application to plaques and had a low active material loading density in the range of 2.25 g/cm³.

Coarser iron oxide particles, such as found in natural magnetite, while costing one-eighth as much as the synthetic magnetite product, when sulfur fuse coated provided only about one-half the Ah/g output. The coarser fuse coated iron oxide material, while having a high active material loading density in the range of 4.2 g/cm³, presented problems of limited electrolyte permeability through the active material. As can be seen, there is need for an improved iron electrode active material which is inexpensive, has a high loading density yet good electrolyte permeability and mechanical properties, while preserving high Ah/g output.

SUMMARY OF THE INVENTION

This invention solves the above problems by providing an optimum additive fuse coated particulate iron oxide active material mixture. This active material comprises a mixture of between about 60-80 weight percent iron oxide particles of about 5 to 85 micron average size having a fuse coating of additive thereon in the range of about 0.5-4 percent of the weight of the iron oxide particles, and about 20-40 weight percent iron oxide particles of about 0.1 to 2.0 micron average size having a fuse coating of additive thereon in the range of about 4-20 percent of the weight of the iron oxide particles.

This combination of different size iron oxide particles, having different surface areas and amounts of fuse coated sulfur, selenium or tellurium additive, provides an iron oxide active material that is inexpensive, has a high final loading density, excellent electrolyte permeability, good mechanical pasting properties, no iron-sulfur separation during aqueous slurry plaque impregnation and surprisingly improved Ah/g output.

BRIEF DESCRIPTION OF THE DRAWINGS

For a better understanding of the invention reference may be made to the preferred embodiments, exemplary of the invention, shown in the accompanying drawings, in which.

DESCRIPTION OF THE PREFERRED EMBODIMENTS

Figure 1:
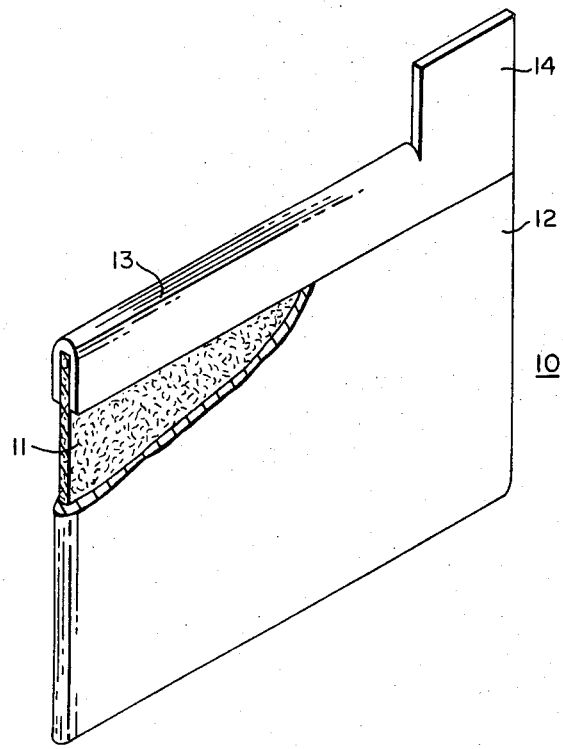
FIG. 1 shows a perspective view of one embodiment of a storage battery plate.

A battery plate is shown at 10 in FIG. 1 and includes a supporting plaque 11, generally of metal fibers, a body of impregnated or pasted active material 12, and a current collecting strap, one embodiment of which is shown as 13, having a lead tab 14. The battery plate 10 is intended for use in a battery with a suitable alkali electrolyte, such as, for example, 25 to 40 weight percent potassium hydroxide.

Figure 2:
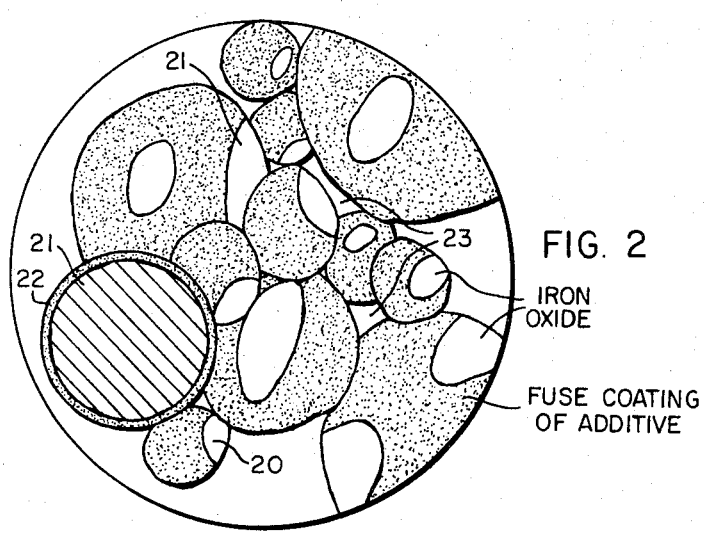
FIG. 2 shows a magnified view of the active material structure.

FIG. 2 shows the active material of this invention, composed of iron oxide and/or iron oxide hydrate particles 20 and 21 substantially fuse coated with sulfur, selenium, or tellurium 22. The iron oxide particles are generally spherical or cubical, and will consist of a mixture of about 20-40 weight percent of very fine particles 20, up to about 2 microns diameter, and about 60-80 weight percent coarse particles 21, over about 5 microns diameter. The voids or pores between the different size fuse coated particles are shown as 23. These pores allow electrolyte penetration through the iron oxide active material.

The supporting plaque of FIG. 1 must be of a highly porous construction. This may be provided by a mesh or grid of fibrous strands, such as nickel or nickel plated iron or steel, which are disposed either in a woven or in an unwoven texture of about 75-95 percent porosity. For example, the plaque structure 11 may be composed of a mesh of fine nickel fibers which are pressed or preferably heat bonded together using diffusion bonding techniques, where there is a diffusion of atoms across the fiber interface without fiber melting which would form melt globules reducing plaque active material loading volume.

Referring again to FIG. 1, the plaque 11 is secured at its upper end to the strap 13 which is composed of a conductive material, which, for purpose of illustration may be a crimped member at the upper end of the structure 11 to hold the same in place and to provide good electrical contact. The lead tab 14 is an integral portion of the strap extending upwardly therefrom in a conventional manner. The top edge of the plaque could also be coined to a high density. The lead tab could then be welded onto the coined edge. The body of active material 12 is disposed on and within the interstices of the supporting plaque. The active material is composed of a mixture of different size particles, which may be applied on the plaque by a filtration process in the form of an aqueous slurry or by a wet pasting process. The active material is compressed to the desired thickness and subsequently dried.

The body of active material can be prepared by initially mixing a slurry of different size particles. The active particles include at least one oxide of iron or iron oxide hydrate and the fuse coated additive which substantially covers the iron oxide surface. The iron particle component can include ferrous oxide (FeO), ferric oxide ($Fe_2O_3$), ferroso-ferric oxide ($FeO \cdot Fe_2O_3$ or $Fe_3O_4$), hydrated ferric oxide ($Fe_2O_3 \cdot H_2O$) and mixtures thereof.

The preferred and most practical additive is sulfur, of about 99 percent purity, in the form of elementary flowers of sulfur, colloidal sulfur, or as pure sulfur particles obtained by evaporation of a solution containing molecular sulfur. The sulfur additive is dry mixed with the iron component particles followed by fusion of the components in a container at about 100°C. to 150°C. High purity selenium and tellurium can also be used as the additive in this invention. Selenium is available as either pellets, stick or shot at 99.9 percent purity. Tellurium is usually marketed with a purity of over 99.7 percent with most of the impurity as selenium.

The iron oxide active material of this invention must comprise a mixture of between about 60–80 weight percent iron oxide having an average particle size between about 5 to 85 microns. This component will have a fuse coating of additive thereon in the range of about 0.5–4 percent of the weight of the iron oxide particles. A suitable iron oxide material satisfying the above requirement is naturally occurring magnetite which is mined, crushed, milled, magnetically separated and then screened. This material is sold commercially as Meramec M25 and contains about 94 weight percent $Fe_3O_4$, 5 weight percent $Fe_2O_3$, 0.3 weight percent $SiO_2$ and 0.3 weight percent $Al_2O_3$, plus minor impurities. It has a density of 5.0 g/cm³, a tapped bulk density of 2.9 g/cm³ and a surface area of about 0.2 sq. meters/g.

The other iron component, comprising about 20–40 weight percent of the mixture is iron oxide having an average particle size between about 0.1 to 2.0 microns. This component will have a fuse coating of additive thereon in the range of about 4–20 percent of the weight of the iron oxide particles. A suitable iron oxide material satisfying the above requirement is synthetic magnetite which is prepared by precipitating ferrous hydroxide from an iron salt solution and then oxidizing with air under rigidly controlled conditions. This material is sold commercially as Mapico Black and contains about 77 weight percent $Fe_2O_3$, 22 weight percent FeO, 0.04 weight percent $SiO_2$ and 0.03 weight percent $TiO_2$, plus minor impurities. It has a density of 4.9 g/cm³, a tapped bulk density of 0.71 g/cm³ and a surface area of about 6.7 sq. meters/g.

Surface impurities, initially present on the iron oxide particle surface do not affect the quality of the final electrode material if the additive fusion procedure is followed carefully. If the fusion vessel lid is not completely tight, allowing gas leakage, then the fusion process serves both to remove impurities from the iron oxide particle surface and to allow additive coating of the iron oxide particles. The blending process serves only to mix the two components (iron particles and additive) uniformly. The heating temperature is the most critical variable in the fusion coating process and will be dependent on the melting point of the additive.

The fusion process of this invention does not involve a chemical reaction between the additive and oxide but a more simple physical process whereby the irregular surface of the iron oxide particles is substantially fuse coated with the additive. In the case of sulfur, if the temperature is kept below the melting range of flowers of sulfur (less than about 100°C) then the fusion process cannot occur. Separation of the iron oxide and sulfur phases will occur if the non-fuse coated material is left standing in water. The temperature range for fusion of sulfur is from about 100°C to 150°C. If the temperature of fusion exceeds about 150°C the liquid sulfur becomes increasingly viscous causing serious complications which result in poor electrochemical utilization of the active material.

The purpose of the additive is to prevent passivation of the iron during discharge and to create a favorable condition for an effective acceptance of charge. The additive apparently promotes a greater degree of disorder in the crystal structure and thereby enhances electrical conductivity of the material. When an electrode is prepared, it is in the discharged condition. It must then be charged by passing a current to convert the iron oxide and iron oxide hydrates to iron metal. The additive apparently catalyzes the reduction of the iron oxide to metallic iron by inhibiting the formation of hydrogen molecules on the oxide surface. If an additive is not present nearly all of the electrical energy is transformed into hydrogen molecule formation.

The use of different weight percent ranges of additive is necessitated by the different particle size and surface area of the different component iron oxides, higher additive content being effective on the iron particles having higher surface areas. Use of over 4 weight percent additive on the coarse iron oxide component or 20 weight percent additive on the fine iron oxide component of the blend will result in an overly dense active material having sulfur insulated iron oxide particles and limited electrolyte permeability. The use of less than 0.5 weight percent additive on the coarse oxides or less than 4 weight percent additive on the fine oxides will result in passivation of the iron oxide particles.

In the iron oxide blend of this invention, the different size particles improve the interphase surface area between the iron oxide and the electrolyte, the fine particles acting as an active material expander or antidensifier and allowing increased void volume between the different size particles and thus improved iron oxide-electrolyte contact.

The use of weight percent ratios outside the blend ranges described above for the iron oxide particles will not provide optimum physical properties and improved output for the active material.

EXAMPLE I

Six iron electrode plates were prepared. Active material Samples A and B contained sulfur fuse coated 0.8 micron Mapico Black synthetic magnetite (77 weight percent $Fe_2O_3$, 22 weight percent FeO) as received from the Cities Service Co. This active material contained 8 weight percent elemental sulfur based on iron oxide weight. Active material Samples C and D contained sulfur fuse coated 15–40 micron Meramec M25 natural magnetite (94 weight percent $Fe_3O_4$, 5 weight percent $Fe_2O_3$), as received from the Moramec Mining Co. This active material contained 1 weight percent elemental sulfur based on iron oxide weight. Samples A, B, C and D were used for comparative testing purposes against the mixed oxide Samples E and F of this invention.

Samples E and F contained a blend of 0.8 micron Mapico Black iron oxide particles, having a fuse coating of 8 weight percent elemental sulfur based on the weight of iron oxide, and 15–40 micron Meramec M25 iron oxide particles, having a fuse coating of 1 weight percent elemental sulfur based on the weight of iron oxide. The blend was a mixture of 70 parts by weight fuse coated Meramec M25 and 30 parts by weight of fuse coated Mapico Black. Samples E and F provided examples of the blended active material of this invention.

The sulfur and iron oxide particles were first dry blended in an electric mixer for about 2 hours, in appropriate amounts to give 1 weight percent and 8 weight percent sulfur content. The blended material was then placed in a Teflon line stainless steel container and closed with a Teflon lined steel lid only made finger tight so as to allow gas leakage. To sulfur-fuse, the closed container was placed in an oven at 120°C for 20 hours and then cooled to room temperature while still closed. The active material was then broken up in a grinder.

The Samples A, B, C and D active material was mixed with water to make a slurry of about 75–100 g active material per 400 ml water. Each slurry was poured and evenly distributed on a diffusion heat bonded nickel fiber plaque, about 85 percent porous and having a surface area of 55 sq. in., positioned in a pasting fixture above a Kinney Type vacuum pump with associated accessories. The sulfurized iron oxide particles were then vacuum impregnated into the plaque, after which the plaque was smoothed and pressed at about 1,000 lb./in², for about 15 seconds, and dried by evaporation, to provide a loading of about 2.2 g/cm³ for Sample plates A and B and about 4.2 g/cm³ for Sample plates C and D.

A blend containing 70 weight percent of the sulfur Meramec M25 described above and 30 weight percent of the sulfurized Mapico Black described above was mixed in an electric mixer for about 2 hours to provide Samples E and F active material. These active material samples were mixed with water to make a slurry, of about 100 g active material per 400 ml water. Each slurry was poured and evenly distributed on a diffusion heat bonded nickel fiber plaque about 85 weight percent porous and having a surface area of 55 sq. in. in a pasting fixture above a Kinney Type vacuum pump with associated accessories. The blended sulfurized iron oxide particles were then vacuum impregnated into the plaque after which the plaque was smoothed and pressed at about 1,000 lb./cm², for about 15 seconds, and dried by evaporation, to provide a loading of about 3.8 g/cm³ for Sample plates E and F.

None of the active battery material separated during the aqueous slurry impregnation of the plaques. Electrochemical test data was obtained for these plates in a battery system also containing two 55 sq. in. nickel dummy electrode plates. The results were as follows:

TABLE I

Performance for double nickel-single iron plate battery systems in 25 weight percent KOH electrolyte. Drain rate was 28 mA/sq. cm. to 0.4 volt vs. Hg/HgO reference electrode.

| Sample | Active Material | Total Wt. | Active Material Wt. | Cycle 8 | | |
|---|---|---|---|---|---|---|
| | | | | Ah | Ah/g | Ah/g Plate |
| A | Mapico 8%S | 102 | 54 | 20.7 | 0.38 | 0.20 |
| B | Mapico 8%S | 106 | 58 | 21.2 | 0.36 | 0.20 |
| C | Meramec 1%S | 155 | 107 | 19.1 | 0.18 | 0.12 |
| D | Meramec 1%S | 147 | 99 | 21.2 | 0.21 | 0.14 |
| E | 70/30 Blend* | 152 | 104 | 40.7 | 0.39 | 0.27 |
| F | 70/30 Blend* | 141 | 93 | 39.3 | 0.42 | 0.28 |

* 70 weight percent Meramec iron oxide 1%S and 30 weight percent Mapico iron oxide 8%S.

The natural magnetite allowed excellent paste density as shown by the active material weights of Samples C and D, but poor output, seemingly due to limited electrolyte accessability, as shown by the values for Ah/g. It of course provides an inexpensive active material. The synthetic magnetite had poor paste density as shown by the active material weights of Samples A and B, but good output as shown by the values for Ah/g. The blend of this invention Samples E and F, having two iron oxide components of different particle size and sulfur content, allowed excellent paste density as shown by the active material weights of Samples E and F and excellent output as shown by the values for Ah/g, besides providing an inexpensive active material.

The above table shows that the blend of this invention, Samples E and F, produces a paste with the loading ability of the unadulterated ore and an Ah/g capacity that is even better than the pure fluffy synthetic magnetite. Thus, the best feature of each iron oxide is obtained without compromising other features. While the use of the blend for this reason alone is desirable, other features of the blend become evident after electrode operation. For example, the blended electrode results in a powder having perhaps twice the shelf stability of the other electrodes at full charge. In addition, charging efficiency is much enhanced.

Tested as individual Fe plates against dummy electrodes the full capacity of the plate can be realized. However, practical testing against real positive electrodes would show no superior capacity if positive plates of limited capacity were used. Since the positive plate is usually the limiting plate in the industry, because of the relative cost of Fe and Ni, the advantage of having an Fe plate of unusually high capacity may appear nebulous. However, real advantages may appear with a cell as unbalanced as this Fe blend would permit. First of all, the iron electrode operates at two voltage levels. About 65 percent of the discharge is at 0.9 volt (Hg/HgO reference) and 35 percent of the discharge is at about 0.7 volt. With excess Fe capacity, it should be possible to discharge to Ni limitation and stay in the upper voltage plateau. Operation in the first 65 percent of plate capacity will be an especially efficient operation with respect to power, temperature control, and electrolyte level.

I claim:

1. A negative electrode plate, for use in a battery, said plate comprising a supporting metal fiber plaque containing an active material comprising iron oxide particles selected from the group consisting of iron oxide, iron oxide hydrate and mixtures thereof, wherein:

A. from about 60–80 weight percent of the iron oxide particles have an average particle size between about 5 to about 85 microns and have a fused coating of additive selected from the group consisting of sulfur, selenium and tellurium present in the range of about 0.5–4 percent of the weight of the iron particles, and B. from about 20–40 weight percent of the iron oxide particles have an average particle size between about 0.1 to about 2 microns and have a fused coating of additive selected from the group consisting of elemental sulfur, selenium, and tellurium present in the range of about 4–20 percent of weight of the iron particles.

2. The plate of claim 1 wherein the iron oxide particles are selected from the group consisting of FeO, $Fe_2O_3$, $Fe_3O_4$, $Fe_2O_3 \cdot H_2O$ and mixtures thereof.

3. The plate of claim 1 wherein the additive is elemental sulfur.

4. The plate of claim 1 wherein the metal fiber in the electrode plaque is selected from the group consisting of nickel, nickel plated iron and nickel plated steel and the plaque is about 75–95 percent porous.

5. The plate of claim 1 wherein the negative electrode plate comprises a diffusion bonded metal fiber plaque containing active material, said plate being contained in a battery having at least one positive plate with alkali electrolyte contacting the plates.

* * * * *